United States Patent
Drolet et al.

(10) Patent No.: US 9,804,316 B2
(45) Date of Patent: Oct. 31, 2017

(54) DISPLAY HAVING BACKLIGHT WITH NARROWBAND COLLIMATED LIGHT SOURCES

(71) Applicant: Apple Inc., Cupertino, CA (US)

(72) Inventors: Jean-Jacques Drolet, San Jose, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 14/476,610

(22) Filed: Sep. 3, 2014

(65) Prior Publication Data

US 2015/0177438 A1 Jun. 25, 2015

Related U.S. Application Data

(60) Provisional application No. 61/919,070, filed on Dec. 20, 2013.

(51) Int. Cl.
*G02F 1/1335* (2006.01)
*F21V 8/00* (2006.01)

(52) U.S. Cl.
CPC .......... *G02B 6/0035* (2013.01); *G02B 6/0056* (2013.01)

(58) Field of Classification Search
CPC ... G02F 1/1335; G02F 1/1336; G02B 6/0016; G02B 6/0073
See application file for complete search history.

(56) References Cited

U.S. PATENT DOCUMENTS

| | | | |
|---|---|---|---|
| 7,296,897 B2 | 11/2007 | Mooradian et al. | |
| 7,686,493 B2 * | 3/2010 | Roshan | B82Y 20/00 313/504 |
| 8,467,133 B2 | 6/2013 | Miller | |
| 8,624,938 B2 | 1/2014 | Kimura | |
| 9,214,608 B2 * | 12/2015 | Kunz | H01L 33/50 |
| 9,405,151 B2 * | 8/2016 | Park | G09G 3/3413 |
| 2005/0264715 A1 * | 12/2005 | Kahen | G02F 1/133617 349/61 |
| 2012/0113679 A1 * | 5/2012 | Boonekamp | G02B 6/0068 362/607 |
| 2012/0188791 A1 * | 7/2012 | Voloschenko | G02B 5/0252 362/606 |
| 2012/0274878 A1 * | 11/2012 | Kunz | H01L 33/50 349/69 |
| 2012/0287117 A1 | 11/2012 | Weber et al. | |

(Continued)

*Primary Examiner* — Timothy L Rude
(74) *Attorney, Agent, or Firm* — Treyz Law Group, P.C.; G. Victor Treyz; Joseph F. Guihan

(57) ABSTRACT

A display has an array of display pixels formed from display layers such as one or more polarizer layers, a substrate on which an array of display pixel elements such as color filter elements and downconverter elements are formed, a liquid crystal layer, and a thin-film transistor layer that includes display pixel electrodes and display pixel thin-film transistors for driving control signals onto the display pixel electrodes to modulate light passing through the display pixels. A light source such as one or more laser diodes or light-emitting diodes may be used to generate light for the display. The light may be launched into the edge of a polymer layer or other light guide plate structure. A light guide plate ma include phase-matched structures such as holographically recorded gratings or photonic lattices that direct the light upwards through the array of display pixels.

14 Claims, 17 Drawing Sheets

(56) References Cited

U.S. PATENT DOCUMENTS

| | | | |
|---|---|---|---|
| 2013/0016296 A1* | 1/2013 | Fujita | H01L 27/322 349/42 |
| 2013/0335677 A1* | 12/2013 | You | G02F 1/133609 349/65 |
| 2014/0119168 A1 | 5/2014 | Matoba | |
| 2014/0140653 A1* | 5/2014 | Brown | G02B 6/0033 385/10 |
| 2014/0140654 A1* | 5/2014 | Brown | G02B 5/1814 385/10 |
| 2015/0131029 A1* | 5/2015 | Kaida | G02F 1/133617 349/69 |
| 2015/0160529 A1* | 6/2015 | Popovich | G02F 1/292 359/200.8 |
| 2015/0205034 A1* | 7/2015 | Facke | G02B 6/0035 362/606 |
| 2017/0162758 A1* | 6/2017 | Weiler | H01L 33/504 |

\* cited by examiner

DISPLAY HAVING BACKLIGHT WITH NARROWBAND COLLIMATED LIGHT SOURCES

This application claims the benefit of provisional patent application No. 61/919,070, filed Dec. 20, 2013, which is hereby incorporated by reference herein in its entirety.

BACKGROUND

This relates generally to electronic devices and, more particularly, to electronic devices with displays.

Electronic devices often include displays. For example, cellular telephones, computers, and televisions have displays.

Displays such as liquid crystal displays have arrays of display pixels. To enhance the visibility of images that are displayed on an array of display pixels, a display may be provided with a backlight. In a typical configuration, an array of light-emitting diodes emits light into the edges of a clear light guide plate. The light guide plate distributes the light laterally across the display. Light scattering features in the light guide plate help scatter the light outwards through the array of display pixels.

Conventional backlight arrangements such as these include additional layers to enhance performance such as a reflector to reflect inwardly scattered light outward through the display pixel array, diffuser layers for homogenizing backlight, compensation films to enhance off-axis viewing, and prism films that help collimate light from the backlight. These layers and other layers in a display may add undesired bulkiness, cost, and complexity. Efficiency losses may also arise due to the presence of black matrix structures in the color filter layer of a display that separate adjacent color filter elements.

It would therefore be desirable to be able to provide a backlight configuration that overcomes these issues.

SUMMARY

A display may have an array of display pixels. The display pixels may be formed from display layers such as one or more polarizer layers, a substrate that supports an array of display pixel elements such as color filter elements formed from colored polymer clear polymer elements, and downconverter elements, a liquid crystal layer, and a thin-film transistor layer. The thin-film transistor layer may include display pixel electrodes and display pixel thin-film transistors for driving control signals onto the display pixel electrodes to modulate light passing through the display pixels.

A light source such as one or more laser diodes or light-emitting diodes may be used to generate light for the display. The light may be launched into the edge of a polymer layer or other planar light guide plate structure. The light guide plate may include phase-matched structures such as holographically recorded gratings or photonic lattices that direct the light upwards through the array of display pixels in the form of narrow collimated beams. Display pixel elements may be provided with microlenses or other light spreading features to ensure that light is distributed over a desired angle.

The light source may include red, green, and blue light sources that are configured to create corresponding red, green, and blue image frames that are displayed sequentially on the array of display pixels in a field sequential display arrangement. If desired, the light source may have fewer colors and the display pixel array may be provided with downconverters to produce other colors. For example, a blue light source may produce blue light that is downconverted to red light by a subarray of red downconverters in the array of display pixels. With this type of arrangement, the light source can be used in providing light for all display pixels simultaneously.

DETAILED DESCRIPTION

Electronic devices may be provided with displays having backlights. Light for a backlight may be provided using a narrowband collimated light source such as a laser diode or nanowire light-emitting diode. The light can be fanned out to the pixel array efficiently using a light guide plate with phase-matched structures such as holographically recorded gratings or photonic lattices. The phase-matched structures may redirect light outwards (e.g., upwards) through an array of display pixels (i.e., the light may be redirected 90°) in the form of a corresponding array of narrow collimated beams. This scheme is able to retain the low etendue of the light source better than the light scattering surfaces on conventional backlight light guide plates. Well-controlled and high-efficiency light redirection techniques are used in place of random scattering and reflection events. Outwardly (upwardly) redirected light front the phase-matched structures in the light guide plate can be accurately aligned with the display pixels' modulating aperture, reducing or eliminating wasteful illumination of black-mask areas.

The display pixel array may be based on liquid crystal display pixel structures. Because the upwardly directed backlight that is incident on each liquid crystal display pixel is narrowband and collimated the liquid crystal display pixels can be optimized to exhibit high contrast and need not be configured to form conventional wide-angle-of-view liquid crystal structures. Rather, the liquid crystal display pixels can be optimized to exhibit high contrast, high transmission, high speed, desirable image retention properties, and other desirable display properties. High speed display pixels may be used for example, to support field sequential color displays. Use of narrowband collimated light sources and associated phase-matched structures for redirecting light through the array of display pixels may allow display thickness to be minimized and may help simplify display backlight structures (e.g., diffuser films and prism films for collimating backlight before the backlight passes through the display pixels may be eliminated).

Electronic devices 10 of the type that may be provided with displays having backlights with narrowband collimated light sources and light-guide plates with holographic gratings or other phase-matched structures for directing light through an array of liquid crystal display pixel structures are shown in FIGS. 1, 2, 3, and 4.

Figure 1:
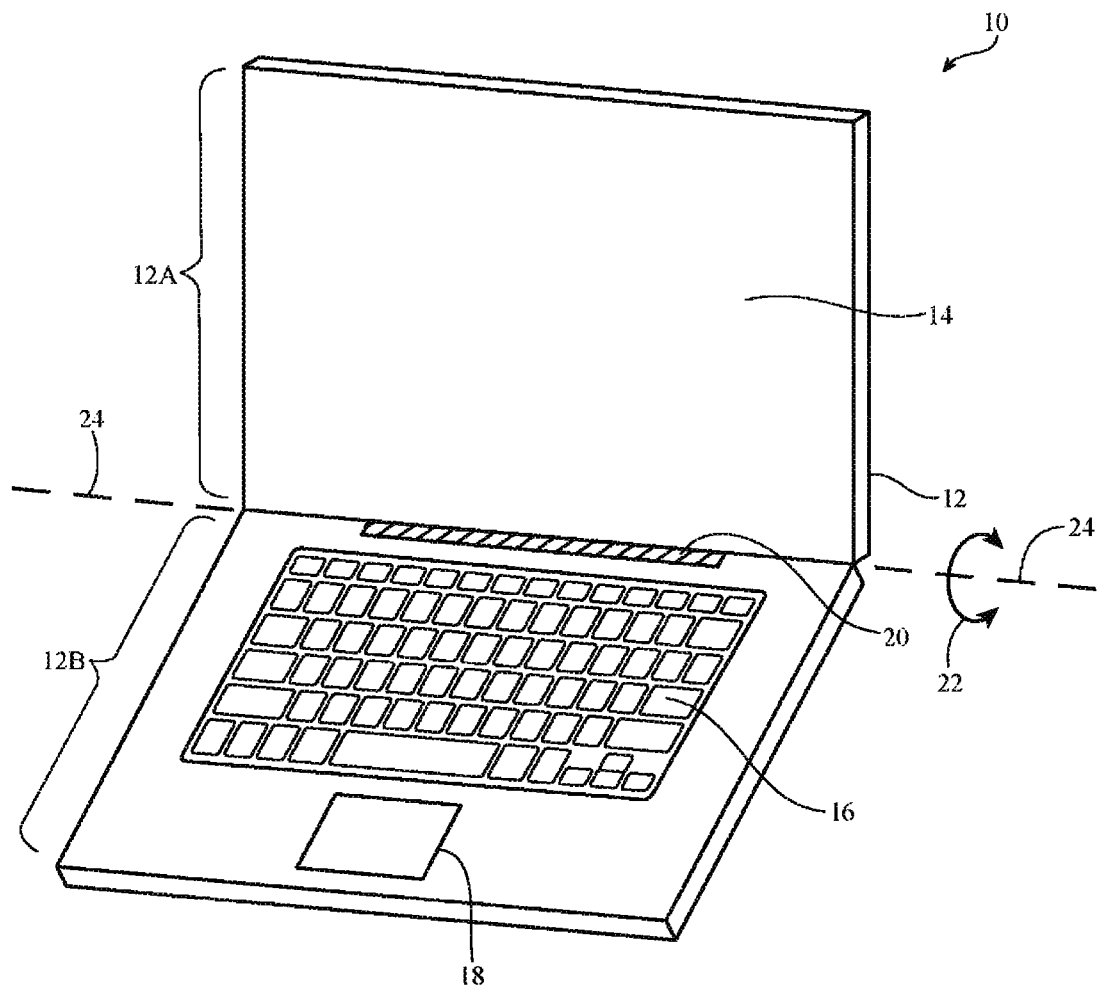
FIG. 1 is a perspective view of an illustrative electronic device such as a laptop computer with a display in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
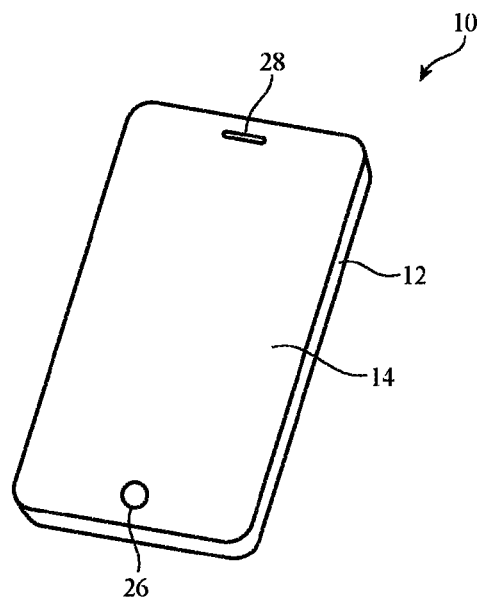
FIG. 2 is a perspective view of an illustrative electronic device such as a handheld electronic device with a display in accordance with an embodiment.

FIG. 2 shows an illustrative configuration for electronic device 10 based on a handheld device such as a cellular telephone music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28. Device 10 may, if desired, be a compact device such as a wrist-mounted device or pendant device (as examples).

Figure 3:
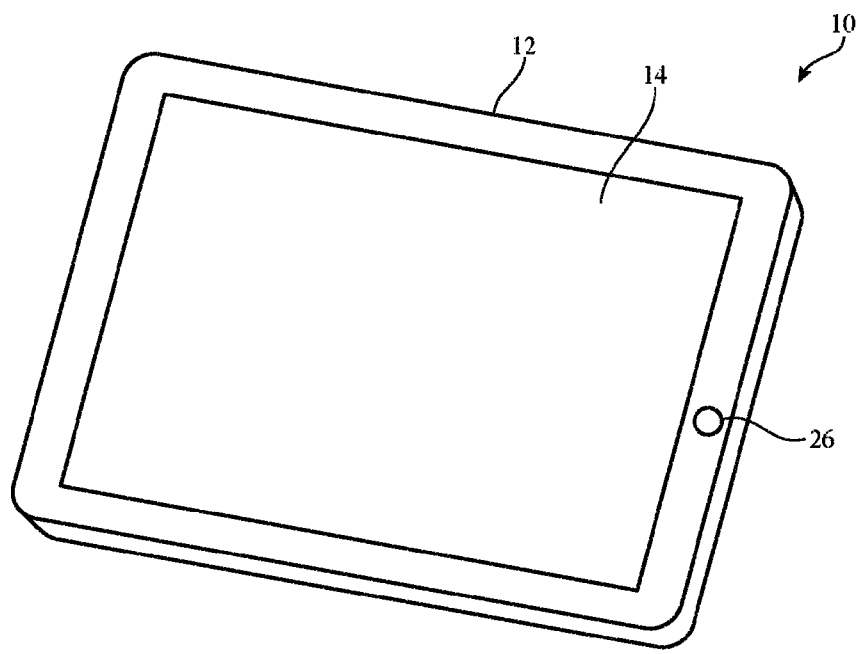
FIG. 3 is a perspective view of an illustrative electronic device such as a tablet computer with a display in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
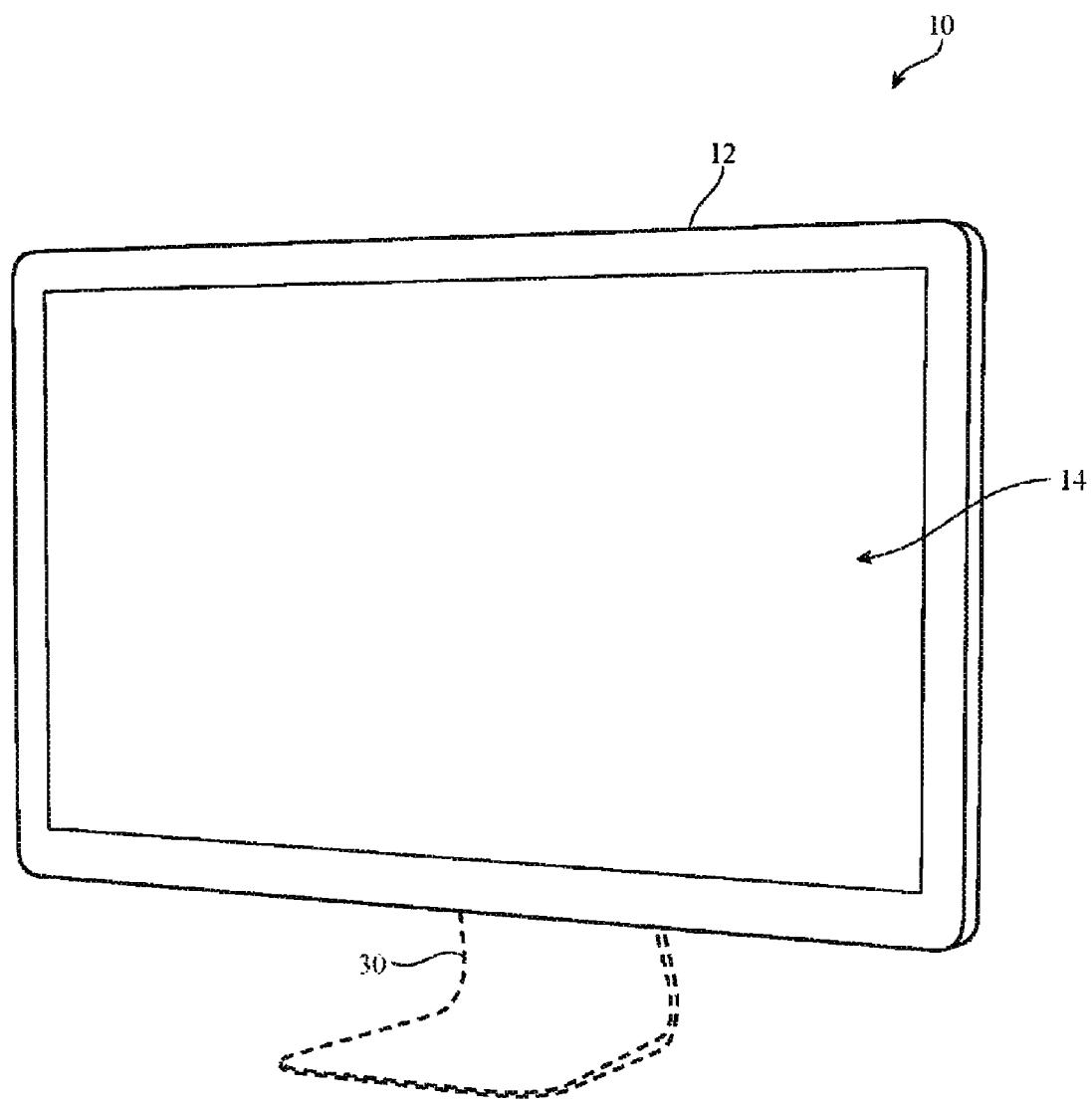
FIG. 4 is a perspective view of an illustrative electronic device such as a display for a computer or television with display structures in accordance with an embodiment.

FIG. 4 shows an illustrative configuration for electronic device 10 in which device 10 is a computer display, a computer that has an integrated computer display, or a television. Display 14 is mounted on a front face of housing 12. With this type of arrangement, housing 12 for device 10 may be mounted on a wall or may have an optional structure such as support stand 30 to support device 10 on a flat surface such as a tabletop or desk.

Display 14 may be a liquid crystal display or a display using other types of display technology. Examples in which display 14 use liquid crystal display technology are sometimes described herein as an example.

Figure 5:
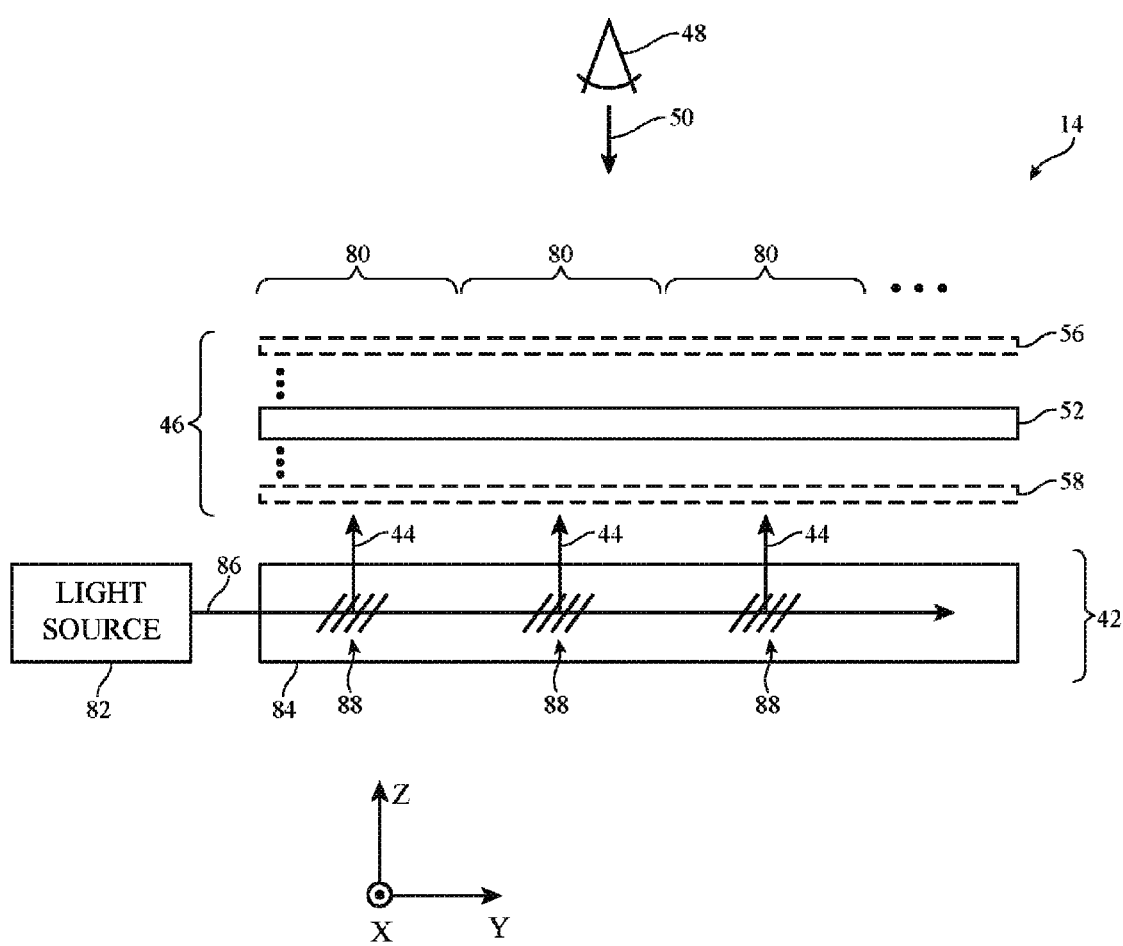
FIG. 5 is a cross-sectional side view of an illustrative display in accordance with an embodiment.

A cross-sectional side view of an illustrative configuration for display 14 of device 10 (e.g., a liquid crystal display for the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixels 80 in display layers 46. This illuminates any images that are being produced by display pixels 80 for viewing by a user. For example, backlight 44 may illuminate images on an array of display pixels formed from display layers 46 that are being viewed by viewer 48 in direction 50. Display pixels 80 may be arranged in rows and columns to from a rectangular array (e.g., an array that lies in the X-Y plane of FIG. 5).

Display layers 46 and the layer(s) of backlight structures 42 may be mounted in chassis structures such as a plastic chassis structure and/or a metal chassis structure to form a display module for mounting in housing 12 or display layers 46 and/or structures 42 may be mounted directly in housing 12 (e.g., by stacking display layers 46 and/or structures 42 into a recessed portion in housing 12).

Display layers 46 may include a liquid crystal layer such a liquid crystal layer 52. Liquid crystal layer 52 may be sandwiched between display layers such as display upper (outer) display layer(s) 56 and lower (inner) display layer(s) 58.

Layers 58 and 56 may be formed from transparent substrate layers such as clear layers of glass or plastic. Layers 56 and 58 may be layers such as a thin-film transistor layer and/or a color filter layer. Conductive traces, color filter elements, downconverter elements, light spreading structures, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes. The electrodes, which are sometimes referred to as display pixel electrodes, may each be associated with a respective display pixel 80. Dating operation of display 14, the display pixel electrodes of the thin-film transistor layer apply electric fields to liquid crystal layer 52 and thereby displaying images on display 14. Layer 56 may be a layer (sometimes referred to as a color filter layer) that includes an array of color filter elements and/or frequency downconverters for providing display 14 with the ability to display color images. If desired, layer 58 may be a color filter layer and layer 56 may be a thin-film transistor layer.

Display 46 may contain one or more polarizer layers. For example, layers 56 may include an upper polarizer. Layer 58 may include an optional lower polarizer and/or light 44 may be polarized upon exiting backlight 42 (in which case the lower polarizer may be omitted to minimize display thickness). During operation of display 14, the relative orientations between the polarization of light 44 entering liquid crystal layer 52 from below and the polarization of the upper polarizer serve to create a normally on or normally of array of display pixels. The thin-film transistors and electrodes in the thin-film transistor layer are used to adjust the liquid crystal material of layer 52 in each display pixel, thereby displaying images on display 14.

As shown in FIG. 5, display backlight structures 42 may include light source 82. Light source 82 may include narrowband light emitters such as one or more laser diodes and/or one or more narrowband light-emitting diodes (e.g., nanowire light-emitting diodes). Light source 82 may emit light 86 at one wavelength blue) or multiple wavelengths (e.g., blue and green or blue, green, and red). Backlight structures 42 may include a light guide plate such as light guide plate 84. Light guide plate 84 may be a planar structure that lies in the X-Y plane of FIG. 5, parallel to display layers 46.

Light source 82 may emit light 86 into one or more edges of light guide plate 84. Light 86 may be distributed within light guide plate 84 due to the principal of total internal reflection. Phase-matched structures 88 in light guide plate 84 may be used to redirect light 86 that is traveling horizontally in the X-Y plane of light guide plate 84 in upwards (outwards) direction Z (i.e., structures 88 may direct light 86 upwards at a 90° angle to serve as backlight 44 for display 14). Light guide plate 84 may be formed from a transparent material such as a clear polymer, nonlinear crystal, or other transparent material. In a rectangular display, light guide plate 84 may have a rectangular footprint matched to a rectangular display active area. Light redirecting structures 88 may be formed from holographically recorded gratings (e.g., in scenarios in which light guide plate 84 is formed from a photosensitive polymer) or other suitable phase-matched structures. Configurations in which structures 88 are implemented using holographically recorded gratings are sometimes described herein as an example.

Gratings 88 may be uniformly distributed throughout light guide plate 84 to ease alignment tolerances between plate 84 and the pixel structures of layers 46. If desired, gratings 88 may be pixelated so that a grating (or concentrated region of a distributed grating) is located in alignment with each of the pixels 80 of display 14. For example, gratings 88 may be configured to form an array of light directing structures that are aligned with corresponding display pixels 80. The array of light directing (redirecting) structures may create a corresponding array of narrow collimated outwardly directed light beams. In particular, the light directing structures may be configured to accurately direct an array of beams of light 44 into the center of each display pixel 80 in the array of display pixels for display 14. The narrow collimated nature of the light beams produced by gratings 88 may make it possible to reduce or eliminate the use of a grid (matrix) of black masking material of the type that is used to isolate adjacent display pixels from each other in the color filter layers of conventional displays.

By using gratings 88 and a narrowband light source 82, light 86 can be efficiently directed upwards through the portions of liquid crystal layer 52 and other display layers 46 of corresponding display pixels 80.

If desired, light source 82 may be configured to emit polarized light (e.g., linearly polarized light from a laser diode source) and gratings 88 may be configured to preserve the polarization of this light (i.e., light 44 exiting gratings 88 in light guide plate 84 may be linearly polarized). In this type of arrangement, it is not necessary to incorporate a lower polarizer into layers 58 to linearly polarize light 44, thereby saving space in display 14. Gratings 88 can also be configured to efficiently direct light vertically upwards in direction Z without substantial light leakage in downwards direction −Z. If desired, a reflector may be placed below light guide plate 84 to help redirect any downwardly directed light back in upwards direction Z or, due to the inherence efficiency of the grating structures of light guide plate 84 in directing light upwards, the reflector can be omitted, thereby helping to reduce display bulk.

It may be desirable to provide display 14 with the ability to display color images (e.g., images formed from an array of display pixels 80 of different colors such as an array of red, green and blue display pixels). Display pixels 80 may be provided with the ability to display color images by using light sources 82 of three different wavelengths of light (e.g., red, green, and blue light 86). Alternatively, or in addition to using light sources that produce three different wavelengths of light, layer 56 or other structures in display 14 may be provided with color filter structures, color downconverter structures, or other display pixel elements for creating tri-color display pixels from monochromatic light 86 or light go of two different colors.

In a color filter element for a display pixel, a display pixel is provided with a colored polymer element (sometimes referred to as a color filter element or color filter) that imparts a desired color to light that is passing through the color filter structure. Color may be imparted to a polymer element using dye that is dissolved within the polymer or using particles of pigment dispersed throughout the polymer. For example, a blue color filter element may have a blue polymer layer formed by dissolving blue the into the polymer layer or formed by incorporating blue pigment into the polymer layer. The blue color filter element will convert white light to blue light, will allow blue light to pass, and will block red and green light. Clear display pixel element structures may also be used. For example, a clear display pixel element may be used to pass blue light that has been directed upwards through liquid crystal layer 52 and other layers 46 from grating structures 88 in light guide plate 84. In a field sequential color arrangement for display 14 in which light source 82 contains red, green, and blue sources that operate in series, clear display pixels may be used to pass red, green, and blue light in respective frames of image data.

Downconverter display pixels are used to change the wavelength of light that is being passed to the viewer. Downconverter structures may be formed by incorporating quantum dots into a clear binder material such as clear polymer. Quantum dots may be formed from semiconductor particles such as cadmium selenide particles. The size of the semiconductor particles (typically on the order of nanometers in diameter) may be selected to tune the band gap of the quantum dots to a desired value. When an energetic wavelength of light (e.g., blue light) illuminates a downconverter, the quantum dots become excited and emit light at a less energetic wavelength associated with the band gap of the quantum dots (e.g., red light). Using this type of arrangement, light 86 of one color can be converted to another (longer wavelength) color. For example, blue light can be converted to red light using a red downconverter, blue light can be converted to green light using a green downconverter, and green light can be converted to a red light using a red downconverter.

In configurations in which display 14 has a light source that emits fewer than three colors of light, downconverters can be used to create additional colors. For example, if light source 82 emits only blue light for an array of display pixels, subarrays of red and green downconverters can be used to create red tight for a subarray of red display pixels and green light for a subarray green display pixels. Some of the blue light can be passed through a subarray of blue color filter elements or clear pixels to create a subarray of blue display pixels.

If light source 82 emits two colors of light, fewer downconverters can be used. For example, if light source 82 emits blue light and green light, the blue (or green) light can be converted to red light using red downconverters.

In configurations in which display 14 has a light source that emits three colors of light, display 14 can be configured to display successive frames of display data in different respective colors. Displays that display red, green, and blue image frames in sequence are sometimes referred to as field sequential color displays. A field sequential color display may use display pixels 80 to display a full frame of red image data using a red light source, followed by respective full green and blue frames using green and blue light sources. Because a single array of display pixels 80 is used for displaying images of three different colors when field sequential color arrangements are used, it is not necessary for the display pixel array to include three respective subarrays of display pixels (e.g., a red subpixel array, a green subpixel array, and a blue subpixel array). Rather, all of the display pixels in the array of display pixels can be used in displaying images.

Display pixels preferably switch relatively fast in a field sequential color arrangement to accommodate the process of displaying fames of three different colors in a frame time that would otherwise be used for displaying all three colors at once. To accommodate fast switching speed requirements in field sequential color arrangements, it may be desirable to form display pixels 80 using liquid crystal electrode configurations that switch relatively quickly (e.g., twisted nematic effect configurations). Other types of display pixels arrangements can be used if desired (e.g., in-plane switching, fringe field switching, etc.).

Figure 6:
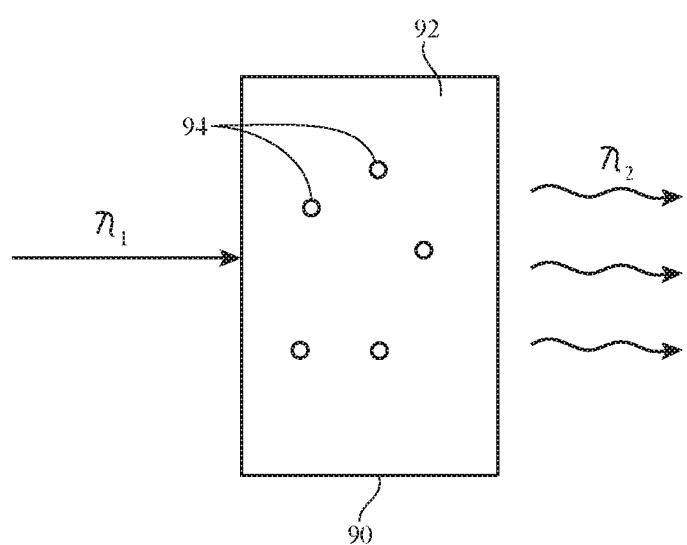
FIG. 6 is a diagram of an illustrative frequency downconverter element of the type that may be used in a display in accordance with an embodiment.

FIG. 6 is a cross-sectional side view of an illustrative downconverter. As shown in FIG. 6, downconverter 90 may have a layer of polymer or other binder material 92 in which quantum dot structures 94 have been embedded. Material 92 may be, for example a polymer such as a clear polymer or a colored polymer. Quantum dots 94 may be formed from semiconductor particles or other nanostructures. Incident light at a first wavelength $\lambda 1$ is absorbed by structures 94 and is remitted. This process converts incoming light at the first wavelength $\lambda 1$ to emitted light at a second wavelength $\lambda 2$ that is longer than $\lambda 1$ (i.e., the second wavelength is at a lower and therefore downconverted frequency).

Light that is emitted from downconverter quantum dot structures 94 tends to have a wider angular spread than incoming collimated light from light guide plate 84. If desired, microlenses, light scattering features such as pits and/or bumps, non-semiconducting embedded particles or voids for diffusing light, or other light spreading optical structures may be incorporated into a downconverter element to further increase the angular spread of the emitted light. The illustrative display pixel downconverter structure of FIG. 6 is merely illustrative.

Figure 7:
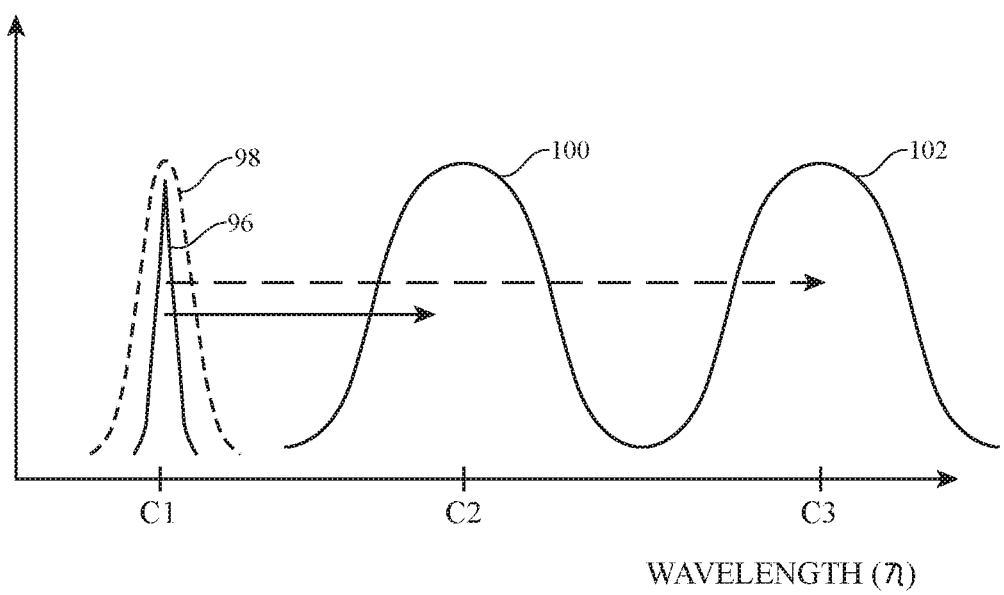
FIG. 7 is a graph showing how light with a short wavelength can be downconverted to produce light at longer wavelengths in a backlight in accordance with an embodiment.

FIG. 7 is a graph showing how light may be downconverted from color C1 (e.g., blue) to other colors C2 (e.g., green) and C3 (e.g., red) using a downconverter such as downconverter 90. In the graph of FIG. 7, light intensity has been plotted as a function of wavelength. Peak 96 corresponds to an illuminating light source color that is at a shorter wavelength (higher frequency) than desired target colors C2 and C3. Peak 96 may, as an example, correspond to blue light. A green downconverter may convert blue light 96 to green light associated with green peak 100. A red downconverter may convert blue light 96 to red light (e.g., peak 102). Peak 96 is narrower than illustrative peak 98. Peak shapes such as illustrative peak 96 may be produced by light sources such as laser diodes (which may have, as an example, a full width at half maximum value of a few nm). Peak shapes such as illustrative peak 98 may be produced by light sources such as light-emitting diodes (which may have, as an example, a full width at half maximum value of 15-20 nm). Use of narrowband light sources may help enhance light redirection efficiency by gratings 88 and display pixel switching performance for the liquid crystal display pixel structures formed using liquid crystal layer 52.

Figure 8:
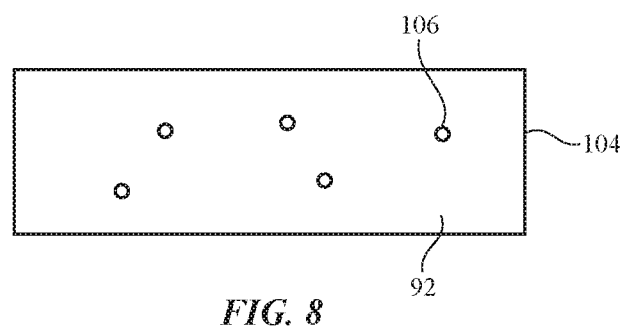
FIG. 8 is a diagram of an illustrative diffuser based on light scattering particles for spreading light in a display in accordance with an embodiment.
Figure 9:
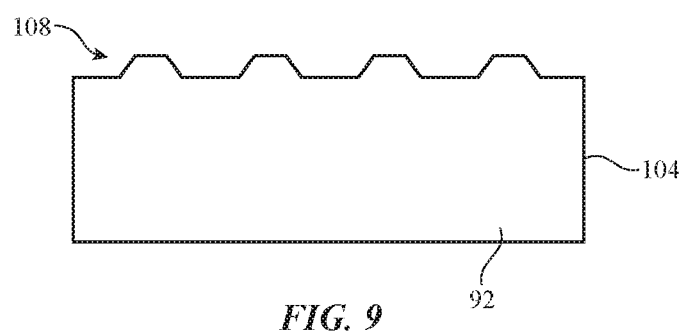
FIG. 9 is a diagram of an illustrative diffuser that has an array of microlenses for spreading light in a display in accordance with an embodiment.
Figure 10:
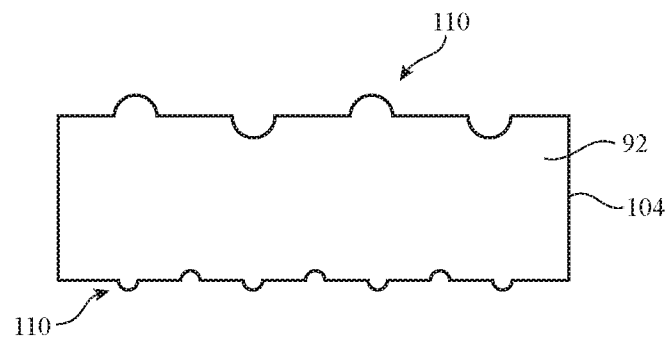
FIG. 10 is a diagram of an illustrative diffuser that has bumps and pits for spreading light in a display in accordance with an embodiment.

FIGS. 8, 9, and 10 are cross-sectional side views of illustrative display pixel elements such as red, green, and blue color filter elements, clear display pixel (filter) elements, and/or downconverters. The display pixel elements of FIGS. 8, 9, and 10 may be formed from polymer or other binder material 92 (e.g., clear and/or colored polymer).

As shown in FIG. 8, display pixel element 104 may include embedded structures such as structures 106. Structures 106 may be quantum dots (e.g., for downconverters), particles of materials such as glass, ceramic, or plastic (e.g., inorganic dielectric particles such as titania particles or organic dielectric particles that are not index-matched to the material of binder 92 and that may therefore serve to scatter light), voids such as bubbles, or other embedded light scattering or wavelength converting structures. These embedded structures may be used for diffusing light (e.g., to serve as light spreading structures that increase the etendue of emitted light from a display pixel), may be used for converting the wavelength of light passing through the display pixel, or may otherwise be used in adjusting the light passing through the display pixel.

FIG. 9 shows how display pixel element 104 may be provided with light spreading structures such as microlenses 108. Microlenses 108 may be provided on the upper and/or lower surfaces of element 104.

FIG. 10 shows how display pixel element 104 may be provided with light scattering features 110 such as pits and/or bumps. Light scattering features 110 and/or other light spreading features such as microlenses may be provided on the upper and/or lower surfaces of each display pixel elements. If desired, light scattering features that are provided on one surface may have a different feature size than the light scattering features provided on an opposing surface. Light scattering features and/or microlenses may also be mixed and/or provided using structures of a uniform size and/or a mixture of sizes. Structures of the type shown in FIGS. 9 and 10 that include one or more surfaces covered with microlenses, light scattering pits or bumps, or other surface features may also be combined with structures of the type shown in FIG. 8 that include embedded structures 106. For example, a downconverter or a clear, red, green, or blue display pixel element may be provided with embedded structures 106, microlenses 108, and/or light scattering features 110. The examples of FIGS. 8, 9, and 10 are merely illustrative.

Figure 11:
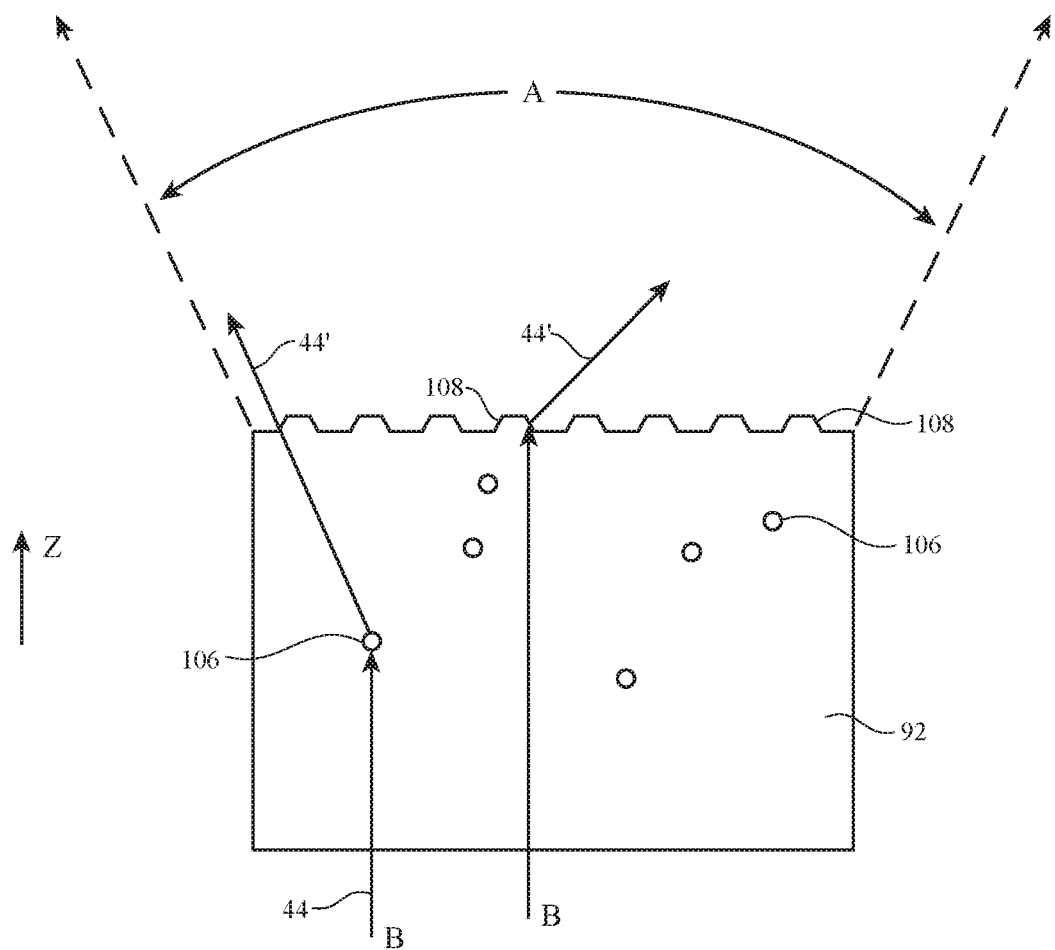
FIG. 11 is a diagram of an illustrative color filter element showing how light scattering features such as embedded particles and surface features such as microlenses can be incorporated into a color filter element to help angularly spread light in a display in accordance with an embodiment.

As shown in the illustrative display pixel element of FIG. 11, a display pixel element may include embedded structures 106 (e.g., quantum dots in a downconverter and/or light scattering particles such as dielectric particles and/or voids filled with air or another gas) and may include surface features such as microlenses 108 and/or pits or bumps. Light 44 that is directed upwards in direction Z by light guide plate 84 (FIG. 2) can be spread over an angle A (i.e., the etendue of light 44 that is passing through a display pixel can be increased to enhance off-axis viewing performance).

Figure 12:
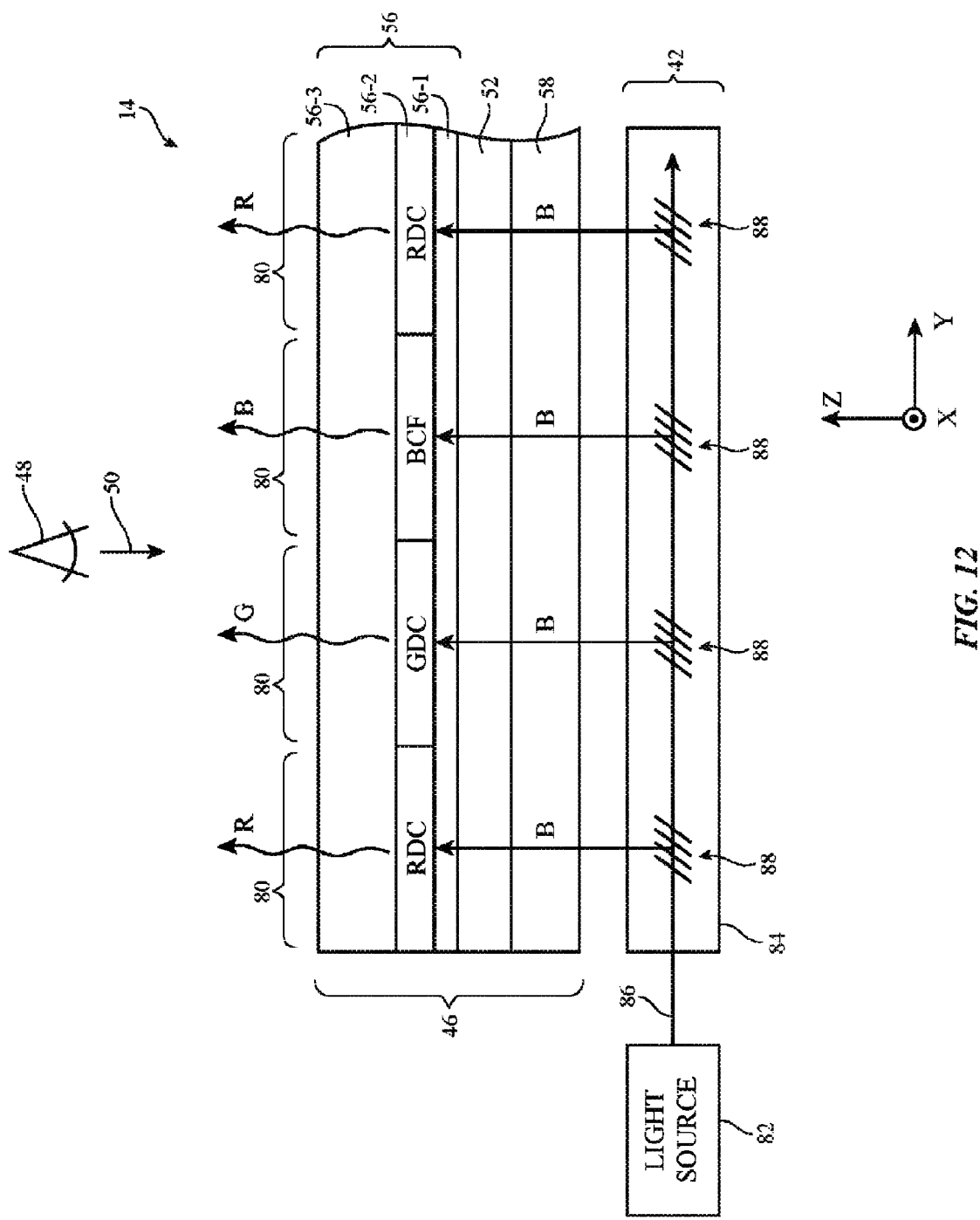
FIG. 12 is a cross-sectional side view of an illustrative display having an array of display pixel elements including downconverters fed by a single-wavelength light source and color filter elements in accordance with an embodiment.

FIG. 12 is a cross-sectional side view of display 14 in a configuration in which upper display lasers 56 include an array of display pixel elements 56-2 having red downconverters RDC, green downconverters GDC, and blue color filter elements BCF. Layers 56 may include upper polarizer layer 56-1. Display pixel elements 56-2 may be formed on a substrate such as substrate 56-3 (sometimes referred to as a color filter layer substrate or display pixel element substrate). Substrate 56-3 may be formed from a clear glass or plastic layer (as examples).

In the illustrative configuration of FIG. 12, light source 82 emits light 86 that is blue (B). Light guide plate 84 may have gratings 88 (e.g., an array of gratings) that direct blue light B upwards in direction Z. Blue light B may, for example, be directed upwards in a rectangular pattern of collimated beams each of which is aligned with the center of a corresponding display pixel 80. The display pixel elements of layer 56-2 may include three subarrays. A first subarray may be made up of red downconverter elements (red downconverters RDC). Each red downconverter RDC receives a beam of blue light B and converts that blue light beam into a corresponding red light beam R. A second subarray may be made up of green downconverter elements (green downconverters GDC). Each green downconverter GDC receives a beam of blue light B and converts that blue light beam into a corresponding green light beam G. A third subarray in display pixel element array 56-2 may be made up of blue color filter elements BCF (i.e. blue color filter elements formed from clear polymer colored with a blue dye or pigment). Each blue element BCF may receive a beam of blue light B and may pass that blue beam without significant attenuation. If desired, clear display pixel elements may be used in place of blue color filter elements BCF.

Gratings 88 may direct light upwards in relatively narrow collimated blue light beams. The liquid crystal structures of display pixels 80 such as the electrodes and other pixel structures that are used in adjusting the liquid crystal material of layer 52 may be optimized to modulate highly collimated monochromatic light (i.e., blue light in the FIG. 12 example) and may therefore exhibit superior performance (e.g., modulation depth, modulation speed, and/or power efficiency) when compared with structures that are designed to switch light of multiple colors. The narrow collimated light beams from light guide plate 84 may not, however, have sufficient angular spread (angle A) to satisfy off-angle viewing requirements for display 14. The quantum dots in downconverters such as red downconverters RDC and green downconverters GDC may increase the angular spread (etendue) of emitted light to satisfy off-angle viewing requirements. Blue color filters or clear display pixel elements (and, if desired, downconverters RDC and GDC) may also incorporate light scattering features, microlenses, and light scattering embedded structures that form integrated light spreading (diffusing) structures. These light spreading features may also increase the etendue of the upwardly propagating light beams to enhance off-axis viewing performance for display 14.

Figure 13:
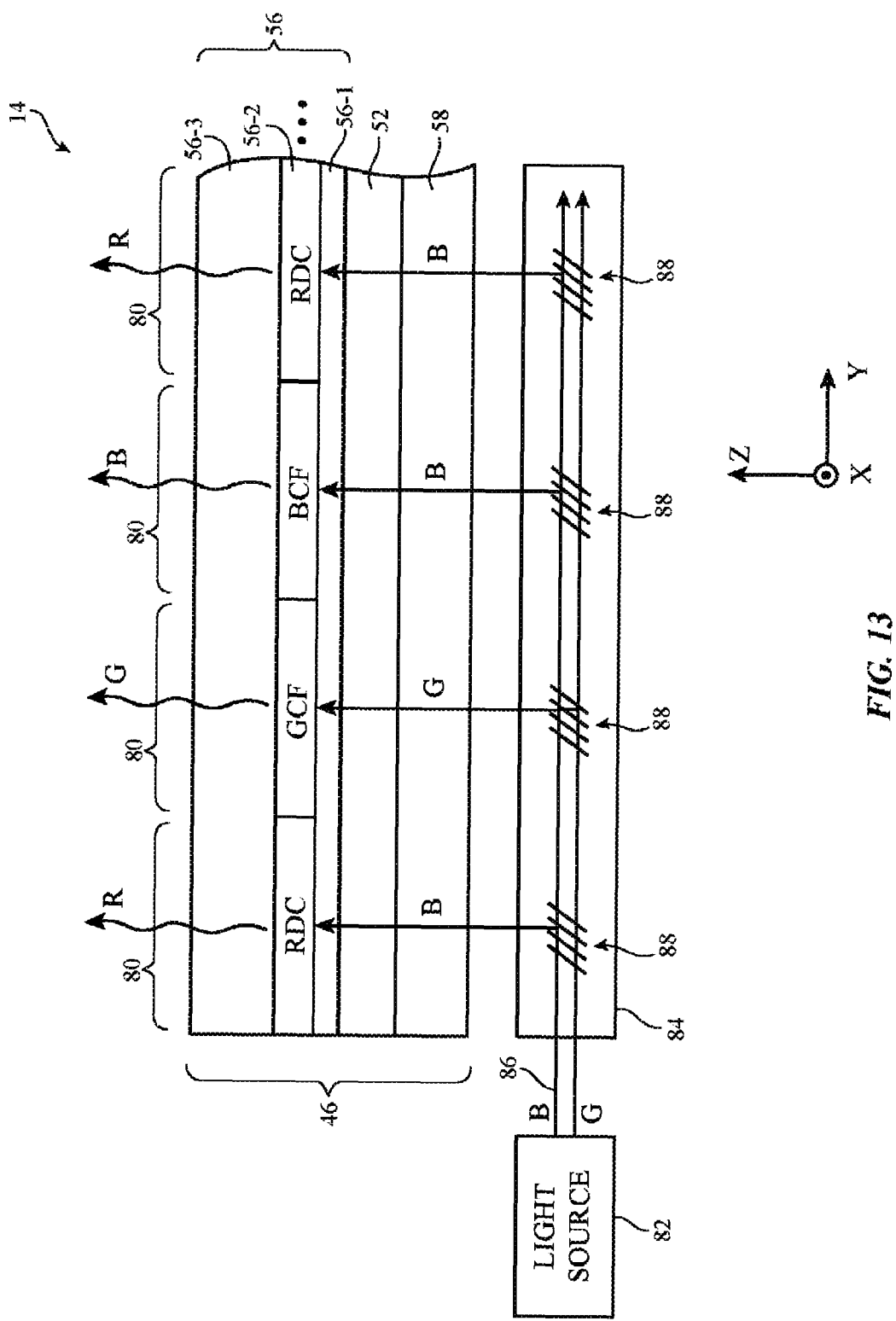
FIG. 13 is a cross-sectional side view of an illustrative display having an array of display pixel elements including downconverters fed by a multiple-wavelength light source and color filter elements in accordance with an embodiment.

In the illustrative configuration of FIG. 13, light source 82 emits light 86 of two colors. In particular, light source 82 emits blue light B and green light G. Display pixel elements 56-2 include red downconverters RDC, green color filter elements GCF (i.e., pixels with clear polymer that has been colored green by incorporation of green dye or pigment or alternatively, clear elements), and blue color filter elements BCF (e.g., pixels with clear polymer that has been colored blue by incorporation of blue dye or pigment or, alternatively, clear elements).

Light guide plate 84 may have holographically recorded gratings 88 that produce an array of blue and green upwardly propagating collimated light beams each of which is aligned with a respective display pixel 80 in display 14. Green tight beams G are aligned with green color filters GCF and pass through the green color filters. Some of the blue light beams B pass through corresponding aligned blue color filters BCF. Other blue light beams B (or, if desired, some of the green light beams) may be downconverted into red light beams R by corresponding aligned red downconverters RDC. Light spreading features such as microlenses, embedded structures, and/or pits and bumps may be incorporated into the display pixel elements to increase etendue. For example, blue color filters B and green color filters GCF may be provided with microlenses or other light spreading features. Red downconverters RDC may emit red light that has more angular spread than the blue light beams B that are applied to the red downconverters and may, if desired, include optional light spreading features such as microlenses, pits, bumps, etc.

Figure 14:
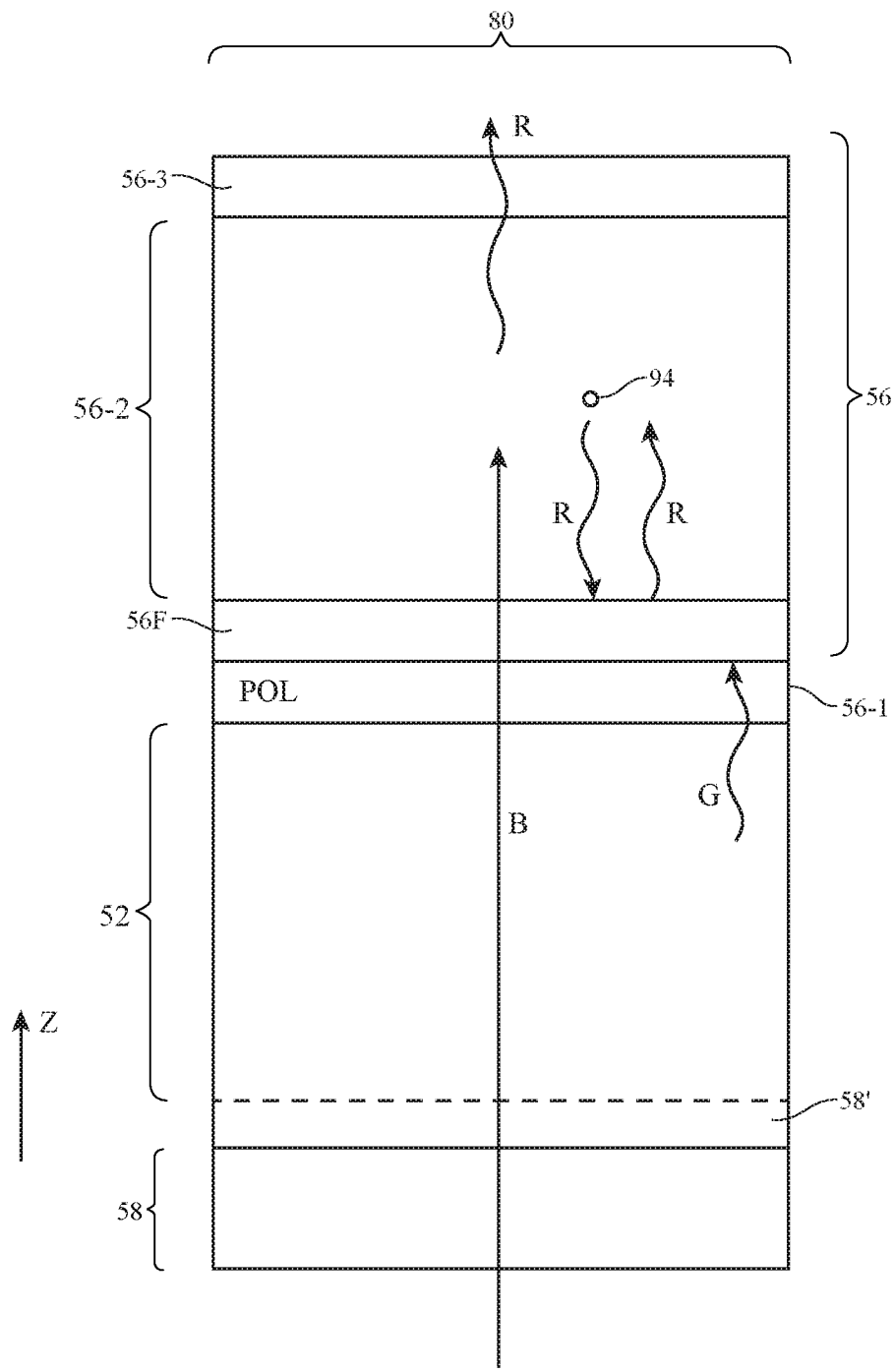
FIG. 14 is a cross-sectional side view of a portion of an illustrative display in which a filter is located on the underside of a downconverter to prevent leakage of downconverted light in accordance with an embodiment.

As shown in illustrative display pixel 80 of FIG. 14, layers 56 may be provided with filters (e.g., dichroic filters) that help prevent light leakage between adjacent display pixels of different colors. Optional lower polarizer 58' may be provided between layer 58 and liquid crystal layer 52. Upper polarizer layer 56-1 may supported by substrate layer 56-3. Display pixel element 56-2 (e.g., a dog in the example of FIG. 14) may be formed on the underside of substrate 56-3. Display pixel element 56-2 may, as an example, be a red downconverter that converts incoming blue light B into red light R for display pixel 80. Filter 56F may be a filter that passes blue light while blocking light of other colors. For example, filter 56F may be a filter formed from a dielectric stack that contains layers of dielectric with different respective index of refraction values (e.g., alternating high and low index materials, stacks with three or more or four or more types of layers with different index values, etc.). The layers of material that form filter 56F may be inorganic materials such as silicon oxide, aluminum oxide, titanium oxide, nitrides, oxynitrides, metal oxides other than aluminum oxide and titanium oxide, etc. As shown in the cross-sectional side view of FIG. 14, red light R that is emitted in downwards direction -Z by quantum dot 94 may be reflected upwards by filter 56F, while upwardly propagating blue light B is allowed to pass into red downconverter 56-2. Green light that has leaked towards the red downconverter from an adjacent green pixel will be blocked by filter 56F before reaching quantum dots 94 (i.e., filter 56F will reduce green crosstalk). Crosstalk can also be reduced by incorporating a green filter on the adjacent green pixel (which will prevent leakage of green light from the green pixel toward the red pixel).

Figure 15:
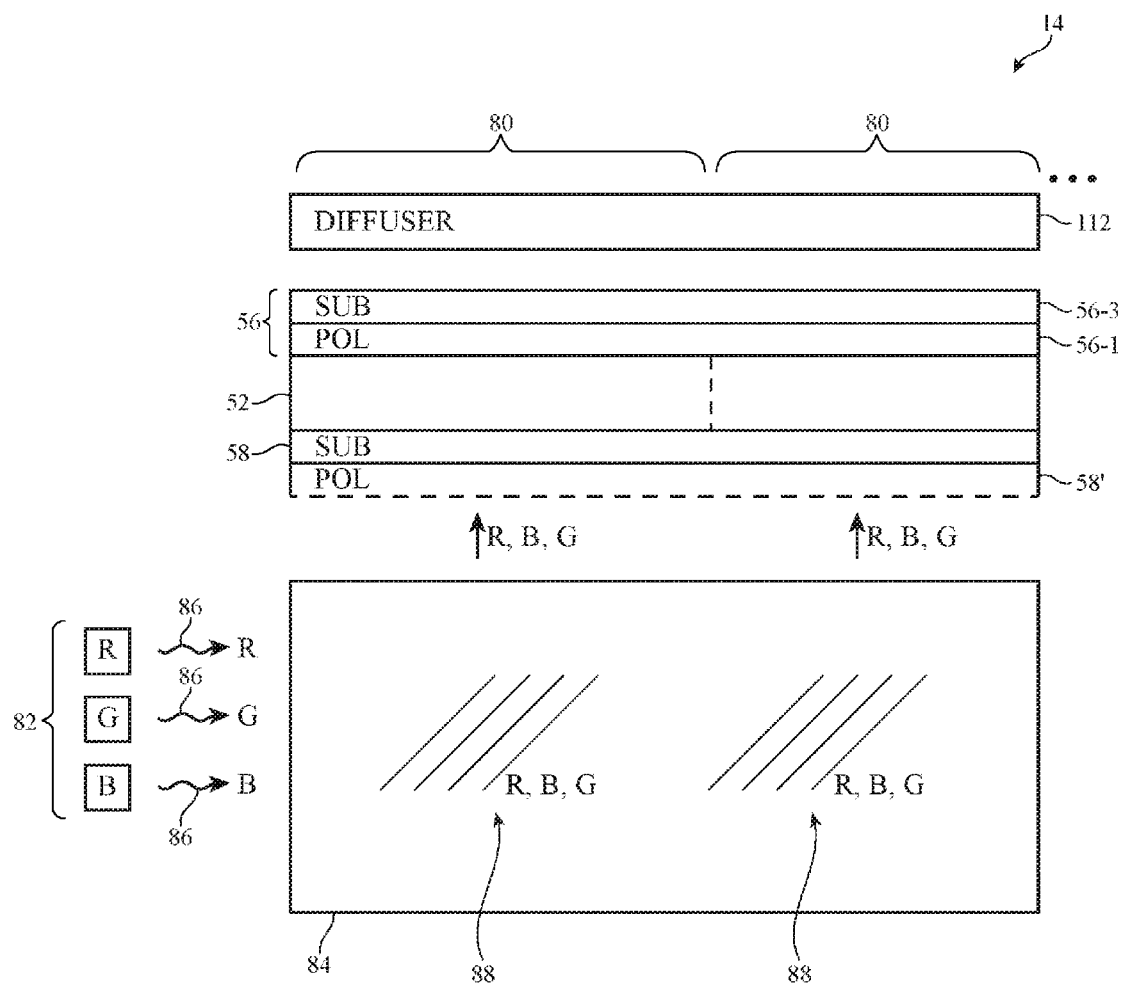
FIG. 15 is a cross-sectional side view of an illustrative display having a multiwavelength light source that is used to sequentially illuminate an array of display pixels using different respective colors in accordance with an embodiment.

As shown in FIG. 15, light source 82 may be used to produce light of three colors such as red light R, green light G, and blue light B. Source 82 may produce each different color in sequence (i.e., display 14 of FIG. 15 may be a field sequential color display that uses a field sequential color scheme to sequentially display image frames of different colors). With this type of arrangement, light guide plate 84 may have gratings 88 that are configured to directly light of all three colors upwards to display pixels 80. In particular, gratings 88 may be used to direct red light R upwards into each of display pixels 80 during image frames in which light source 82 is emitting red light R, gratings 88 may be used to direct green light G upwards into each of display pixels 80 during image frames in which light source 82 is emitting green light G, and gratings 88 may be used to direct blue light B upwards into each of display pixels 80 during image frames in which light source 82 is emitting blue light B. The color filter elements and downconverter elements of layer 56-2 may be omitted from layer 56, because colors are imparted into the images on display 14 by producing sequential red, green, and blue frames produced by corresponding red, green, and blue sources in source 82 rather than using simultaneously displayed red, green, and blue light patterns associated with respective red, green, and blue subpixel arrays. To ensure that the liquid crystal display pixel switching structures of display 14 switch sufficiently fast to support field sequential color operation, display pixels 80 may be implemented using twisted nematic structures or other structures that switch rapidly (as an example).

Figure 16:
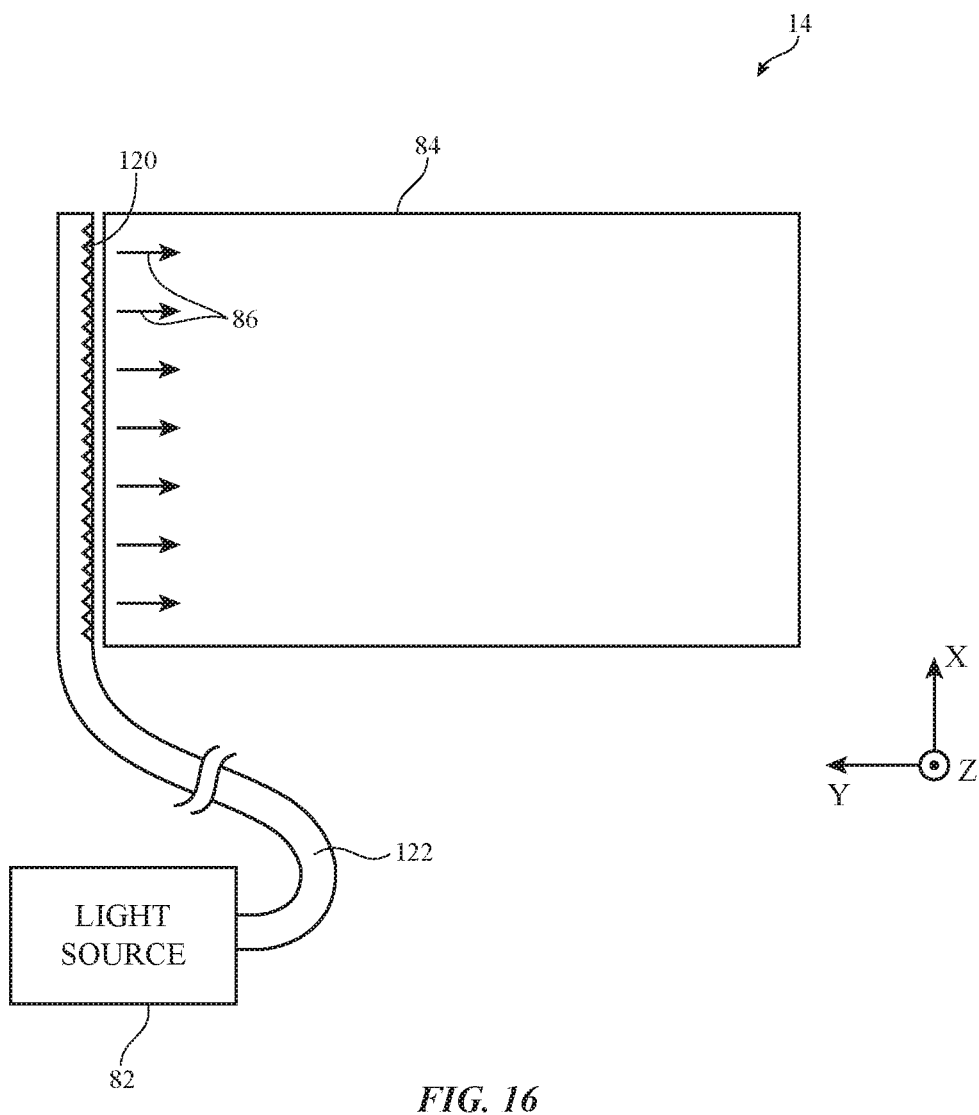
FIG. 16 is a top view of an illustrative light guide plate in a display showing how a fiber with grating structures may be used to emit light into the edge of the light guide plate in accordance with an embodiment.

If desired, light 86 may be distributed into light guide plate 84 using gratings 120 that run along an optical fiber such as optical fiber 122 of FIG. 16. With this type of arrangement, light source 82 emits light into fiber 122. Gratings 120 in fiber 122 are configured to direct light 86 from inside fiber 122 into one or more of the edges of light guide plate 84. Emitted light 86 may then propagate in the X-Y plane of light guide plate 84 before gratings 88 direct light 86 upwards in direction Z though display pixels 80.

Figure 17:
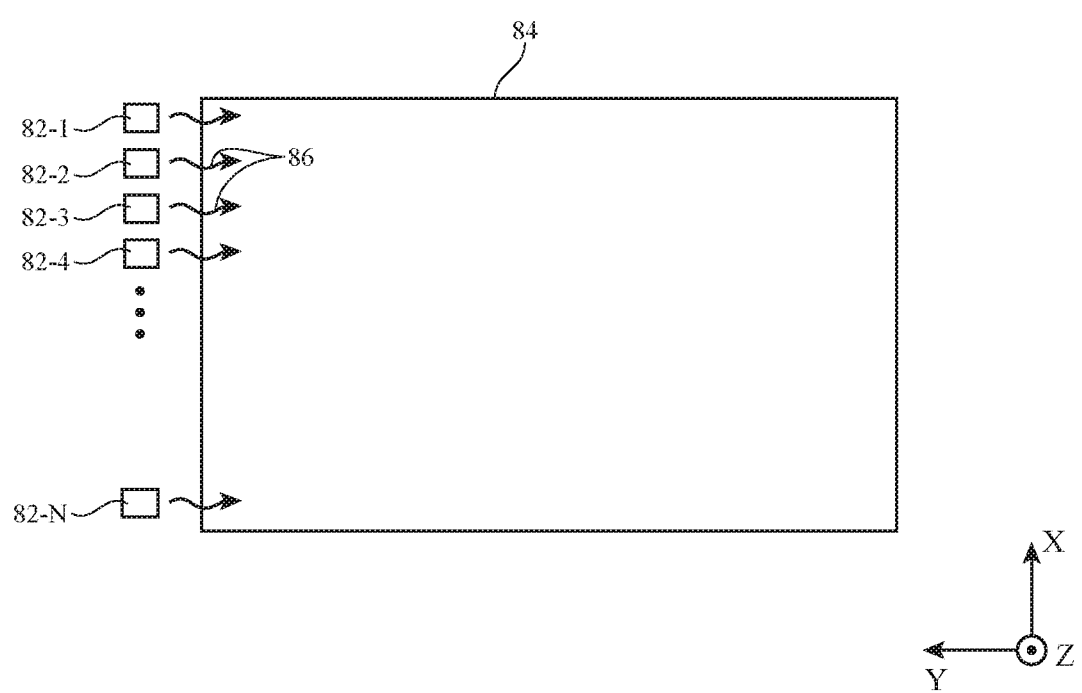
FIG. 17 is a top view plan illustrative light guide plate being edge lit by an array of light sources such as an array of light-emitting diodes in accordance with an embodiment.

In the illustrative backlight configuration of FIG. 17, light 86 is emitted into an edge of light guide plate 84 from an array of light sources 82-1, 82-2, 82-3, 82-4, . . . 82-N. The light sources of FIG. 17 may be laser diodes or light-emitting diodes and may emit light 86 of one or more colors.

Figure 18:
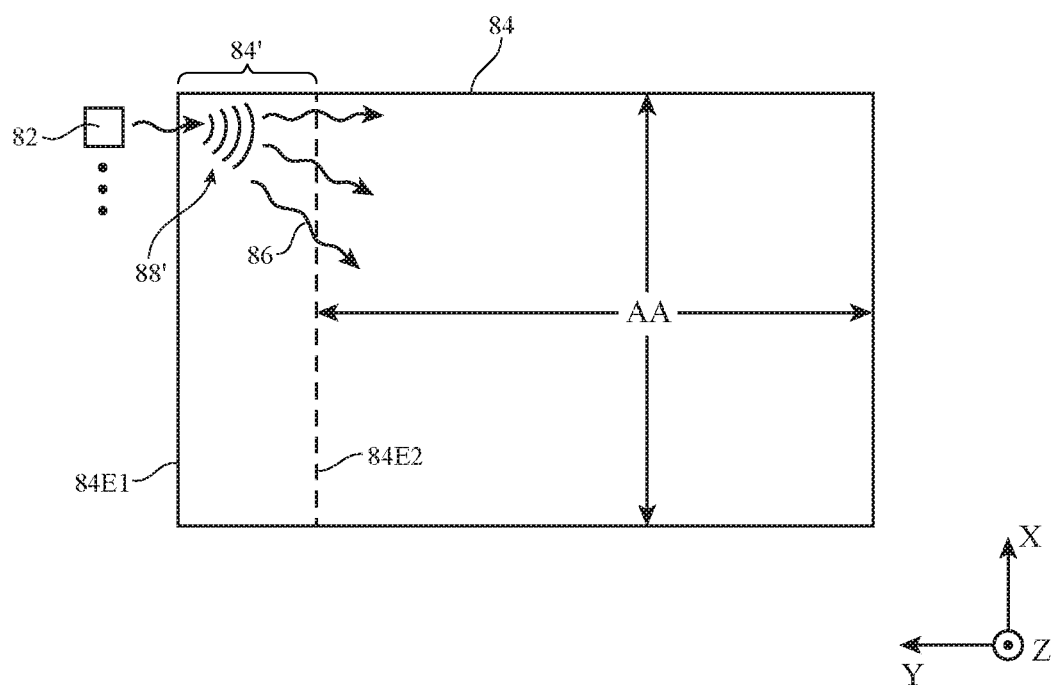
FIG. 18 is a top view of an illustrative light guide plate in which a grating structure is being used to distribute light from a light source along the edge of a display active area in accordance with an embodiment.

In the illustrative arrangement of FIG. 18, light guide plate 84 has an active area AA that overlaps a rectangular array of display pixels 80 and has an inactive mixing area 84'. Light sources 82 emit light 86 into edge 84E1 of light guide plate 84. Gratings 88' or other light scattering features (pits, bumps, embedded structures, etc.) in region 84' help mix light 86 so that light 86 evenly illuminates edge 84E2 of active area AA.

Figure 19:
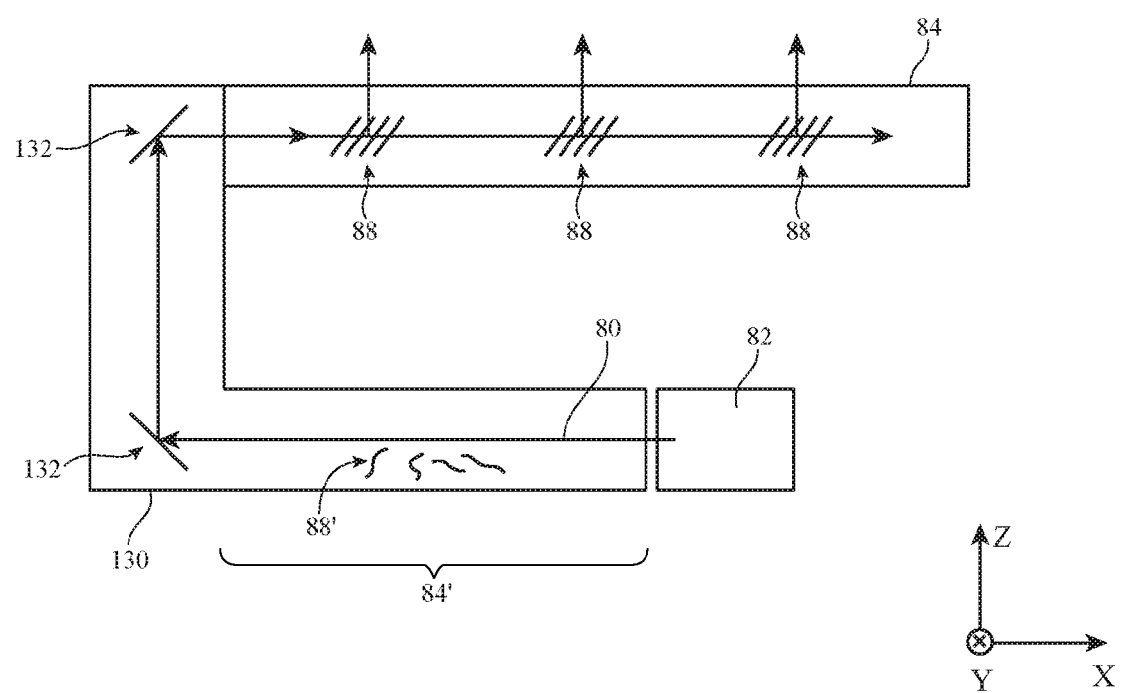
FIG. 19 is a cross-sectional side view of an illustrative display backlight structure in which light is being routed from a light source in one plane to a light guide plate in a parallel plane using light guiding structures in accordance with an embodiment.

The lateral dimensions of light guide plate 84 can be minimized by performing mixing using light mixing structures 84' that are located in a different X-Y plane than light guide plate 84. This type of arrangement is shown in the cross-sectional side view of FIG. 19. As shown in FIG. 19, light source 82 emits light 86 that is mixed (e.g., laterally distributed as shown in FIG. 18) using gratings 88' or other structures in mixing structures 84'. Vertical light guide structures 130 (e.g., clear polymer or glass structures) may include light reflectors 132 (e.g., gratings, mirrors, prims, etc.) that distribute light 86 upwards in direction Z. Structures 84', 130, and 84 may be formed from a single layer of polymer that has been bent or otherwise formed into the shape shown in FIG. 19 or may be formed from separate optical structures that are assembled together in housing 12 of device 10 or a display chassis. If desired, a bent section of light guide plate material or other C-shaped optical path (e.g., a curved light guide without internal mirrors) may be used to form structures 130. For example, a strip of bent clear plastic or glass may be used to route light from a lower plane associated with light source 82 to an upper plane including light guide plate 84. Mixing structures 84' may also be integrated into structures 130, if desired. The curved light guide structure can be provided with a relatively large bend radius to allow the light guide structure to confine light due to total internal reflection or may be provided with a metal coating to help confine the light.

Figure 20:
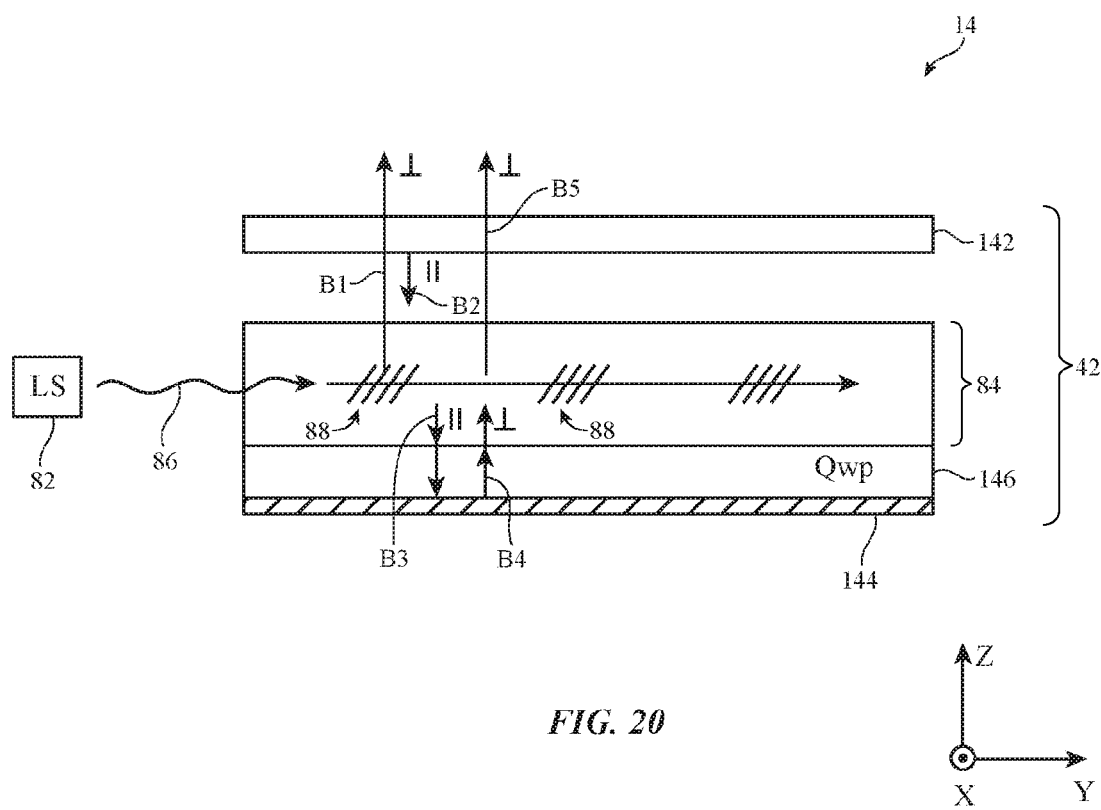
FIG. 20 is a cross-sectional side view of an illustrative display backlight structure having a reflective polarizer in accordance with an embodiment.

FIG. 20 shows how a reflective polarizer may be used in producing linearly polarized light for display 14. As shown in FIG. 20, light source 82 may produce unpolarized light 86. Unpolarized light 86 may be emitted into the edge of light guide plate 84. Light guide plate 84 may include gratings 88. Gratings 88 may be configured to redirect linearly polarized light upwards in direction Z. In particular, beams of light such as illustrative polarized beam B1 may be directed upwards to reflective polarizer 142. Beam B1 may have a first linear polarization state (e.g., a linear polarization that is oriented perpendicular to the page in the example of FIG. 20). Reflective polarizer 142 may be configured to pass light with this polarization and to reflect any light that has an orthogonal polarization (see, e.g., reflected beam B2, which has a second linear polarization state that is parallel to the page in the example of FIG. 20). Reflected beam B2 may pass through the gratings of light guide plate as beam B3 without reflection because the gratings are configured to reflect perpendicularly polarized light rather than parallel polarized light (in this example). A quarter wave plate such as quarter wave plate 146 may be mounted below light guide plate 84. A reflector such as reflector 144 may be mounted below quarter wave plate 146. Beam B3 passes through quarter wave plate 146 in downwards direction -Z and is reflected hack upwards from reflector 144 as beam B4. Due to the presence of quarter wave plate 146, upwardly propagating beam B4 will have a linear polarization that is orthogonal to that of beam B3 (i.e., beam B4 will be linearly polarized in an orientation that is perpendicular to the page of FIG. 20 in this example). This beam, which forms beam 135 of FIG. 20 may pass through light guide plate 84 and reflective polarizer 142 to serve as additional backlight for display 14.

The foregoing is merely illustrative and various modifications can be made by those skilled in the art without departing from the scope and spirit of the described embodiments. The foregoing embodiments may be implemented individually or in any combination.

What is claimed is:

1. A display, comprising:

an array of display pixels formed from a layer of liquid crystal material, a polarizer layer, and a thin-film transistor layer;

a light source that emits exclusively blue light and green light; and a light guide plate having phase-matched structures that direct the blue and green light from the light source through the array of display pixels, wherein the light guide plate has opposing upper and lower surfaces connected by an edge, wherein the layer of liquid crystal material overlaps the upper surface of the light guide plate, wherein the thin-film transistor layer is interposed between the light guide plate and the layer of liquid crystal material, wherein the light source emits light into the edge of the light guide plate, wherein the array of display pixels comprises a first subarray of display pixels having red downconverters that convert the blue light to red light, a second subarray of display pixels through which the green light passes, and a third subarray of display pixels through which the blue light passes.

2. The display defined in claim 1 wherein the light source comprises a laser.

3. The display defined in claim 1 wherein the light source comprises a light-emitting diode.

4. The display defined in claim 1 wherein the phase-matched structures comprise gratings.

5. The display defined in claim 4 wherein the light guide plate comprises a layer of polymer and wherein the gratings comprise holographically recorded gratings in the layer of polymer.

6. The display defined in claim 1 wherein the display pixel elements that pass the blue light have light spreading features.

7. The display defined in claim 6 wherein the light spreading features comprise microlenses.

8. The display defined in claim 6 wherein the display pixel elements that pass the blue light are formed from a polymer and wherein the light spreading features include structures embedded within the polymer.

9. The display defined in claim 1 wherein the red downconverters comprise polymer in which quantum dots are embedded and wherein the quantum dots comprise semiconductor particles.

10. The display defined in claim 9 further comprising dichroic filters adjacent to the red downconverters.

11. A display, comprising:

display layers that includes a liquid crystal layer and at least one layer containing light spreading features, wherein the display layers are configured to form an array of display pixels to display images;

a light source that produces exclusively blue light and green light; and a light guide plate having holographically recorded gratings that direct the blue and green light from the light source through the display pixels, wherein the light guide plate has at least a first holographically recorded grating that directs only the green light from the light source through the display pixels, wherein the light guide plate has at least a second holographically recorded grating that directs only the blue light from the light source through the display pixels, and wherein the liquid crystal layer is interposed between the layer containing light spreading features and the light guide plate.

12. The display defined in claim 11 wherein the display pixels include red downconverters, wherein the at least second holographically recorded grating directs a first portion of the blue light from the light source through the red downconverters, and wherein the red downconverters convert the blue light to red light.

13. The display defined in claim 12, wherein the display pixels comprise blue color filter elements and wherein the at least second holographically recorded grating directs a second portion of the blue light from the light source through the blue color filter elements.

14. The display defined in claim 13, wherein the display pixels comprise green color filter elements and wherein the at least first holographically recorded grating directs the green light from the light source through the green color filter elements.

* * * * *